United States Patent
Smith et al.

(10) Patent No.: US 6,623,677 B1
(45) Date of Patent: Sep. 23, 2003

(54) DECORATED ARTICLE MADE BY FILM INSERT MOLDING

(75) Inventors: Stephen G. Smith, Bethel Park, PA (US); Patrick J. Griffin, Coraopolis, PA (US); Keith R. Heffley, Pittsburgh, PA (US); Diane D. Dougherty, Aliquippa, PA (US)

(73) Assignee: Bayer Corporation, Pittsburgh, PA (US)

( * ) Notice: Subject to any disclaimer, the term of this patent is extended or adjusted under 35 U.S.C. 154(b) by 213 days.

(21) Appl. No.: 09/620,777

(22) Filed: Jul. 21, 2000

(51) Int. Cl.$^7$ ................................................ B29C 45/14
(52) U.S. Cl. ........................ 264/132; 264/135; 264/250; 264/267; 264/275; 425/127; 425/129.1
(58) Field of Search .................. 264/132, 135, 264/250, 267, 275; 425/127, 129.1

(56) References Cited

U.S. PATENT DOCUMENTS

| 2,811,744 A | | 5/1957 | Baldanza ..................... 18/5.3 |
| 4,395,263 A | * | 7/1983 | Davis ............................ 8/471 |
| 4,917,927 A | | 4/1990 | Sakaitani et al. ............. 428/40 |
| 5,264,172 A | | 11/1993 | Rosica et al. ............... 264/132 |
| 5,514,317 A | | 5/1996 | Rosica et al. ............... 264/132 |
| 5,679,616 A | * | 10/1997 | Payne ......................... 503/227 |
| 5,707,697 A | * | 1/1998 | Spain et al. .................. 428/31 |
| 5,831,641 A | * | 11/1998 | Carlson ......................... 347/2 |

FOREIGN PATENT DOCUMENTS

| EP | 0619171 | 10/1994 |
| EP | 0811505 | 12/1997 |
| EP | 0914923 | 5/1999 |
| FR | 2728194 | 6/1996 |
| WO | 98/09790 | 3/1998 |

\* cited by examiner

*Primary Examiner*—Edmund H. Lee
(74) *Attorney, Agent, or Firm*—Joseph C. Gil; Aron Preis; James R. Franks

(57) ABSTRACT

A process for making a decorated article is described. The process entails printing, using a high temperature ink, a design on a surface of transfer paper, and transferring the design by sublimation to the surface of a clear flat substrate to obtain a decorated substrate. The thus decorated surface is then placed in a mold and thermoplastic resin is injected to form an article. The placing of the decorated substrate in the mold is such that the surface carrying the design faces the inside of the mold. An additional embodiment entails forming the decorated substrate to attain a three dimensional decorated substrate prior to placing it in the mold.

18 Claims, No Drawings

DECORATED ARTICLE MADE BY FILM INSERT MOLDING

FIELD OF THE INVENTION

The invention concerns a method of manufacturing a decorated article of thermoplastic composition, more particularly, the method entails film insert molding.

SUMMARY OF THE INVENTION

A process for making a decorated article is described. The process entails printing, using a high temperature ink, a design on a surface of transfer paper, and transferring the design by sublimation to the surface of a clear flat substrate to obtain a decorated substrate. The thus decorated surface is then placed in a mold and thermoplastic resin is injected to form an article. The placing of the decorated substrate in the mold is such that the surface carrying the design faces the inside of the mold. An additional embodiment entails forming the decorated substrate to attain a three dimensional decorated substrate prior to placing it in the mold.

BACKGROUND OF THE INVENTION

Methods for preparing thermoplastically molded articles that carry decorative designs are known. Such articles are known to be prepared by injecting a thermoplastics molding composition into a mold. The decorative design is applied to a surface of the article by any of the well-known silk screening or flexographic printing techniques. Articles thus made often lose the decorative design upon friction, or have their aesthetic appeal diminished by scratches, which are encountered upon use.

Products of the general type entailed in the present invention have been made for many years by a method known in the art as an in-mold decorating process, or film-insert molding. This process, in use about thirty years, has been employed in the production of prints on resinous sheets that were used in the course of injection molding to form finished products. In this prior art process, the overlays or in-mold decorative sheets were produced by offset printing and/or by screen-printing, and the parts were. flat and were held fast into the mold by means such as static charge. This process was characterized in that it required special gating design and in that it limited the freedom of the printed design since the introduction of the plastic needed to be limited to areas where there was no ink; the interaction between design and ink would tend to move or distort the graphics.

The art is noted to include U.S. Pat. No. 2,811,744, that described a method that avoids some of the drawbacks of the prior art. Accordingly, the method thus described entails injecting the thermoplastics composition directly onto a sheet of paper that carries the decorative design that is printed with a transferable ink, the paper having been positioned in the injection mold. This ink is capable of being separated from the paper under the thermal conditions that prevail in the course of injection molding. In the course of injection, the transferable ink separates from the paper and adheres to the molded thermoplastic composition, resulting in a surface-decorated article. This method is deficient in that articles thus decorated often feature deformed or destroyed decorations. This deficiency is a result of having the molten composition move against the paper in the course of injection.

A further method of manufacturing a decorated article by injection molding was disclosed in U.S. Pat. No. 4,931,248. This method entails printing a design onto a surface of a support, the printing made using a transferable ink. The ink is characterized in that it may be separable from the support in response to heating. The printed support is introduced into a mold and a separate film is then also introduced into the mold in a position to be applied against the printed surface of the support. After introducing the support and the film, a thermoplastic material is injected into the mold. The introduction of the support is such that at least during the injection (i) the support is applied against a wall of the mold with the printed surface turned facing the inside of the mold and (ii) introduction of the film is carried out so that one surface of the film is applied against the printed surface of the support and the other surface of the film bonds itself to the thermoplastics material. The transferable ink is separating from the support and is deposited on the film under the thermal conditions prevailing in the course of injection of the molten resin.

A method of making applique products of the type made of synthetic resins and having printing thereon has been disclosed in U.S. Pat. No. 5,264,172. The method entails printing on the surface of a substrate of synthetic resin, using a formable ink, and placing the substrate in a mold cavity in a secure position with the front surface of the substrate in contact with the surface of the mold and injecting a molten resin into the cavity space. Also relevant is the method of in-mold decorating process disclosed in U.S. Pat. No. 4,917, 927, the method entails a novel printing step.

DETAILED DESCRIPTION OF THE INVENTION

In accordance with the present invention, there is provided a method for making a decorated thermoplastically molded article. The method yields articles wherein the decorative design loses none of its sharpness after time in service.

The method entails printing a design or legend (herein "design") that is intended to decorate the molded object onto one surface of a transfer paper using a high temperature transferable ink. Such printing, as well as the transfer paper and high temperature transferable ink are known. Briefly, however, the suitable transfer paper is available in commerce under the generic name of photo quality ink-jet paper. As an example of such suitable transfer paper, mention is made of AccuPlot EPQ 8511C, a product of Mile High Engineering which was found to be very suitable. Printing of the decoration or the legend may be carried out by any of the known techniques, including screen-printing and flexographic printing. In a particularly preferred embodiment, the decorative design or legend may be printed digitally. In this preferred embodiment, the resolution of the print is preferably no lower than 1440×720 dpi (dots per inch). Such resolution is attained by using, for instance, Epson Stylus Color 3000 printer. The high temperature ink, suitable in the context of the present invention is characterized in that it is capable of being sublimated and in that it remains virtually free of thermal degradation under the conditions prevailing in the injection molding process. Such suitable high temperature ink is available in commerce under the trademark Sublijet from Sawgrass.

The thus, decorated transfer paper is then, in a subsequent step of the inventive process, positioned with the legend side facing a plastic substrate, and sufficient heat, optionally along with pressure, is applied to cause sublimation of the ink and transfer of the design to the plastic substrate.

A plastic substrate in the context of the present invention is preferably in the form of a film having a thickness of 0.0035" to 0.040"; the plastic substrate preferably comprises transparent and/or clear resin. Included among the suitable resins making up the substrate are any of polycarbonate homopolymers, copolycarbonates, acrylonitrile-butadiene-styrene resins (ABS), styrene/acrylonitrile (SAN), polyamides, thermoplastic polyurethane, as well as blends of polycarbonate, including blends with ABS. Thermoplastic compositions containing acrylic resins and polycarbonate resins are preferred. In a preferred embodiment, the substrate is in the form of a laminate containing at least two layers. In such an embodiment, one of the layers is PVF (poly vinyl fluoride) or PVDF (poly vinylidine fluoride).

The substrate that now carries the printed decoration, or legend, may be placed in an injection molding mold in its flat unshaped form or, in the alternative, be formed into a three dimensional shape that replicates the inner surface of the injection mold, trimmed to eliminate excess material, and then placed in the mold. The walls of the mold define, when the mold is closed, a cavity having the shape and dimensions of the article that is to be molded. The decorated substrate is placed in the mold in such a manner that its surface, that carries the design, faces the inside of the mold. Upon the injection of the thermoplastic composition, the substrate will press against the wall of the mold by the pressure of the injected material. Unlike the process disclosed in U.S. Pat. No. 4,931,248 in the present method, the ink forming the decorative design is in direct contact with the molten thermoplastic composition. After the injection, the mold is opened and the molded article removed.

The substrate comprises material that strongly bonds to the resin making up the injection-molded article. Optimization of the bonding of the substrate to the molded article resulting from the injection-molding step-is within the purview of the art-skilled. It may be mentioned here that good results were obtained in preparing decorated articles in accordance with the inventive process, using polycarbonate based composition as the injected material and a polycarbonate film as the substrate. In an additional successful embodiment, the substrate used was a two-ply laminate of polycarbonate (thickness of 0.020") and PVDF (having a thickness of 0.0015").

Experimental Section

In preparing decorated articles in accordance with the invention, the following materials and equipment were used:

Printer: Epson Stylus Color 3000

Transfer paper: AccuPlot EPQ, from Mile High Engineering, photo-quality ink jet paper.

Ink: Sublijet for Epson Stylus Color 3000, from Sawgrass Inc.

Heat Transfer Press: Astex 1350, Manual Flat Bed Heat Transfer Press, a product of Astechnologies A digital image was first prepared by computer graphics application, Photoshop, Corel Draw. The printer was loaded with the 4 Sublijet color cartridges and with the transfer paper. The digital image was printed in photo quality mode, 1440×720 dpi. A polycarbonate film was placed on the bed of the heat press. The side to be sublimated onto was positioned facing the heated platen. The paper containing the sublimated image was placed on top of the film: the ink side facing the film, the non-printed side facing the heated platen. The platen was heated to about 300° F. The platen was then closed and clamped. The clamp pressure was 40 psi. Heat transfer time (sublimation time) was about 15 to 60 seconds. The platen was then opened. The transfer paper was manually peeled from the film. The ink has sublimated onto the surface of the film. The film containing the image was then formed, trimmed and placed in an injection mold. Molding by injection proceeded conventionally.

Additional articles molded in accordance with the invention made use of a coextruded laminate as the substrate. The laminate contained one ply made of a blend of polycarbonate and ABS and a second ply of PVDF. The films were decorated as noted above, formed, die-cut and used in molding decorated articles following the inventive technique.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for making a decorated article comprising:
   (i) printing by a high temperature dye-based inkjet ink a design on a surface of transfer paper;
   (ii) transferring the design by sublimation to a second surface of a clear flat substrate comprising at least one member selected from the group consisting of polycarbonate homopolymers, copolycarbonates, acrylonitrile-butadiene-styrene resins (ABS), styrene/acrylonitrile (SAN), polyamides, thermoplastic polyurethane, and blends of polycarbonate to obtain a decorated substrate;
   (iii) placing said decorated substrate in a mold, with the second surface of the decorated substrate facing the inside of said mold; and
   (iv) injecting a thermoplastic composition into said mold to form an article.

2. The process of claim 1, wherein the substrate comprises at least one member selected from the group consisting of polycarbonate homopolymers, copolycarbonates and thermoplastic polyurethane.

3. The process of claim 1, wherein the substrate comprises a multiplied laminate that includes at least one ply of polycarbonate resin.

4. The process of claim 3, wherein the laminate comprises at least one ply containing poly vinyl fluoride (PVF).

5. The process of claim 3, wherein the laminate comprises at least one ply containing poly vinylidine fluoride (PVDF).

6. The process of claim 1 wherein the thermoplastic composition contains polycarbonate resin.

7. The process of claim 1, wherein the printing is made digitally via inkjet printing.

8. A process for making a decorated article comprising:
   (i) printing by a high temperature dye-based inkjet ink a design on a surface of transfer paper;
   (ii) transferring said design by sublimation to a second surface of a clear flat substrate comprising at least one member selected from the group consisting of polycarbonate homopolymers, copolycarbonates, acrylonitrile-butadiene-styrene resins (ABS), styrene/acrylonitrile (SAN), polyamides, thermoplastic polyurethane, and blends of polycarbonate to obtain a decorated substrate;
   (iii) forming the decorated substrate to attain a three-dimensional decorated substrate;
   (iv) placing said three-dimensional decorated substrate in a mold, with the second surface of said three-dimensional decorated substrate facing the inside of said mold; and
   (v) injecting a thermoplastic composition into said mold to form an article.

9. The process of claim 8, wherein the substrate comprises at least one member selected from the group consisting of polycarbonate homopolymers, copolycarbonates and thermoplastic polyurethane.

10. The process of claim 8, wherein the substrate comprises a laminate having at least one ply containing poly vinyl fluoride (PVF).

11. The process of claim 8, wherein the substrate comprises a laminate having at least one ply containing poly vinylidine fluoride (PVDF).

12. The process of claim 8 wherein the thermoplastic composition contains polycarbonate resin.

13. The process of claim 8, wherein the printing is made digitally via inkjet printing.

14. A process for making a decorated article comprising:
   (i) printing by a high temperature dye-based inkjet ink a design on a surface of transfer paper;
   (ii) transferring said design by sublimation to a second surface of a clear flat substrate comprising a laminate comprising at least one ply of polycarbonate and at least one ply of poly vinylidine fluoride (PVDF) to obtain a decorated substrate;
   (iii) placing said decorated substrate in a mold, with the second surface of said decorated substrate facing the inside of said mold; and
   (iv) injecting a thermoplastic composition into said mold to form an article such that a strong bond develops between the second surface of the decorated substrate and the thermoplastic composition.

15. The process of claim 14, wherein the at least one ply of polycarbonate further includes acrylonitrile-butadiene-styrene resins (ABS).

16. A process for making a decorated article comprising:
   (i) printing by a high temperature dye-based inkjet ink a design on a surface of transfer paper;
   (ii) transferring the design by sublimation to a second surface of a clear flat substrate comprising a polycarbonate homopolymer to obtain a decorated substrate;
   (iii) placing said decorated substrate in a mold, with the second surface of the decorated substrate facing the inside of said mold; and
   (iv) injecting a thermoplastic composition into said mold to form an article such that a strong bond develops between the second surface of the decorated substrate and the thermoplastic composition.

17. A process for making a decorated article comprising:
   (i) printing by a high temperature dye-based inkjet ink a design on a surface of transfer paper;
   (ii) transferring the design by sublimation to a second surface of a clear flat substrate comprising a copolycarbonate to obtain a decorated substrate;
   (iii) placing said decorated substrate in a mold, with the second surface of the decorated substrate facing the inside of said mold; and
   (iv) injecting a thermoplastic composition into said mold to form an article such that a strong bond develops between the second surface of the decorated substrate and the thermoplastic composition.

18. A process for making a decorated article comprising:
   (i) printing by a high temperature dye-based inkjet ink a design on a surface of transfer paper;
   (ii) transferring the design by sublimation to a second surface of a clear flat substrate comprising a thermoplastic polyurethane to obtain a decorated substrate;
   (iii) placing said decorated substrate in a mold, with the second surface of the decorated substrate facing the inside of said mold; and
   (iv) injecting a thermoplastic composition into said mold to form an article such that a strong bond develops between the second surface of the decorated substrate and the thermoplastic composition.

* * * * *